United States Patent
Vissamsetti (10) Patent No.: US 10,374,967 B2
(45) Date of Patent: Aug. 6, 2019

(54) PROFILE-BASED PLACEMENT OF CLIENTS

(71) Applicant: VMware, Inc., Palo Alto, CA (US)

(72) Inventor: Badarinadh Vissamsetti, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 566 days.

(21) Appl. No.: 14/137,851

(22) Filed: Dec. 20, 2013

(65) Prior Publication Data

US 2015/0120932 A1  Apr. 30, 2015

(30) Foreign Application Priority Data

Oct. 28, 2013  (IN) .......................... 4855/CHE/2013

(51) Int. Cl.
*G06F 15/173* (2006.01)
*H04L 12/911* (2013.01)
*G06F 9/50* (2006.01)

(52) U.S. Cl.
CPC ............ *H04L 47/70* (2013.01); *G06F 9/5044* (2013.01); *G06F 9/505* (2013.01); *G06F 9/5055* (2013.01)

(58) Field of Classification Search
CPC ....................................................... H04L 47/70
USPC ....................................................... 709/226
See application file for complete search history.

(56) References Cited

U.S. PATENT DOCUMENTS

| | | | | |
|---|---|---|---|---|
| 6,641,481 B1* | 11/2003 | Mai | ......................... | A63F 13/12 463/29 |
| 2006/0143617 A1* | 6/2006 | Knauerhase | .............. | G06F 9/50 718/104 |
| 2012/0167094 A1* | 6/2012 | Suit | ..................... | G06F 11/3409 718/100 |
| 2012/0297380 A1* | 11/2012 | Colbert | ............... | G06F 9/45558 718/1 |
| 2013/0111468 A1* | 5/2013 | Davis | .................... | G06F 9/5077 718/1 |
| 2014/0337428 A1* | 11/2014 | Kau | .................. | G06F 17/30424 709/204 |
| 2015/0058305 A1* | 2/2015 | Scharmann | .......... | G09B 29/106 707/695 |

* cited by examiner

*Primary Examiner* — Vivek Srivastava
*Assistant Examiner* — Karina J Garcia-Ching
(74) *Attorney, Agent, or Firm* — Loza & Loza, LLP (57) ABSTRACT

A client placement module and method for placing a client in a distributed computer system uses at least one requirement profile with profile parameters to determine whether any host computer in the distributed computer system satisfies resource requirements of the client and also matches the profile parameters in the at least one requirement profile.

20 Claims, 5 Drawing Sheets

PROFILE-BASED PLACEMENT OF CLIENTS

CROSS REFERENCE TO RELATED APPLICATION

This application is entitled to the benefit of Indian Patent Application No. 4855/CHE/2013 filed in the Indian Patent Office on Oct. 28, 2013, which is incorporated herein by reference.

BACKGROUND

Placement of resource-consuming clients, such as virtual machines (VMs), on the right host devices in a distributed computer system is an important factor in efficiently utilizing physical resources in the distributed computer system. An effective client placement strategy must meet the requirements of the clients and optimize several, sometimes conflicting, goals, while taking into consideration the complexities of the distributed computer system.

Conventional automated placement techniques exist that can place a new client on a host device that is less loaded in terms of CPU and memory. However, these automated placement techniques are typically limited to CPU and memory loads on host devices when selecting which clients should be placed on which host devices. If a user wants to factor in other criteria, the user would need to manually check each and every host device in the inventory to select the host device that satisfies all the required criteria, which could be tedious and time consuming process if the inventory of host devices is large. In addition, this process would have to be repeated if there are multiple clients with different requirements.

SUMMARY

A client placement module and method for placing a client in a distributed computer system uses at least one requirement profile with profile parameters to determine whether any host computer in the distributed computer system satisfies resource requirements of the client and also matches the profile parameters in the at least one requirement profile.

A method for placing a client in a distributed computer system in accordance with an embodiment of the invention comprises creating at least one requirement profile for the client using profile parameters provided by a user, the at least one requirement profile including at least some of the profile parameters, determining whether any host computer in the distributed computer system satisfies resource requirements of the client and also matches the profile parameters in the at least one requirement profile, and identifying a host computer in the distributed computer system as a suitable host computer to place the client if the host computer satisfies the resource requirements of the client and also matches the profile parameters in the requirement profile. In some embodiments, the steps of this method are performed when program instructions contained in a computer-readable storage medium is executed by one or more processors.

A client placement module for a distributed computer system in accordance with an embodiment of the invention comprises a profile creation unit and a profile matching engine. The profile creation unit is configured to create at least one requirement profile for a client to be placed in the distributed computer system using profile parameters provided by a user. The requirement profile includes at least some of the profile parameters. The profile matching engine is configured to determine whether any host computer that satisfies the resource requirements of the client also matches the profile parameters in the at least one requirement profile so that a host computer in the distributed computer system can be identified as a suitable host computer to place the client.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
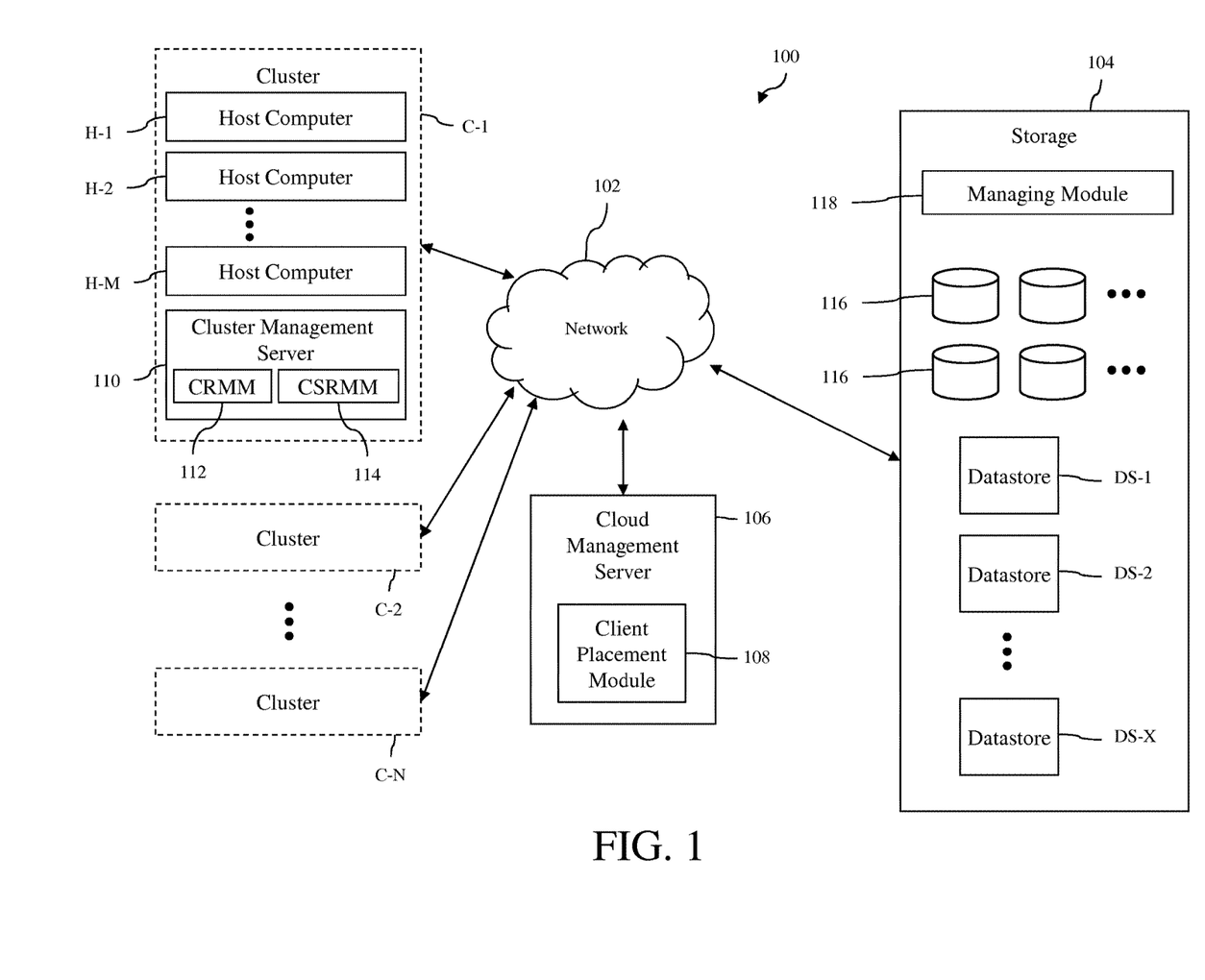
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-N (where N is a positive integer) of host computers, storage 104 and a cloud management server 106 with a client placement module 108. The exact number of host computer clusters included in the distributed computer system can be from few clusters to tens of clusters or more. The host computers of the different clusters, the storage and the cloud management server are connected to the network. Thus, each of the host computers in the clusters is able to access the storage via the network and may share the resources provided by the storage with the other host computers. Consequently, any process running on any of the host computers may also access the storage via the network.

In the illustrated embodiment, each of the clusters C-1, C-2 . . . C-N includes a number of host computers H-1, H-2 . . . H-M (where M is a positive integer) and a cluster management server 110 with a cluster resource management module (CRMM) 112 and a cluster storage resource management module (CSRMM) 114. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in one or more server racks. Typically, the host computers of a cluster are located within the same server rack.

Figure 2:
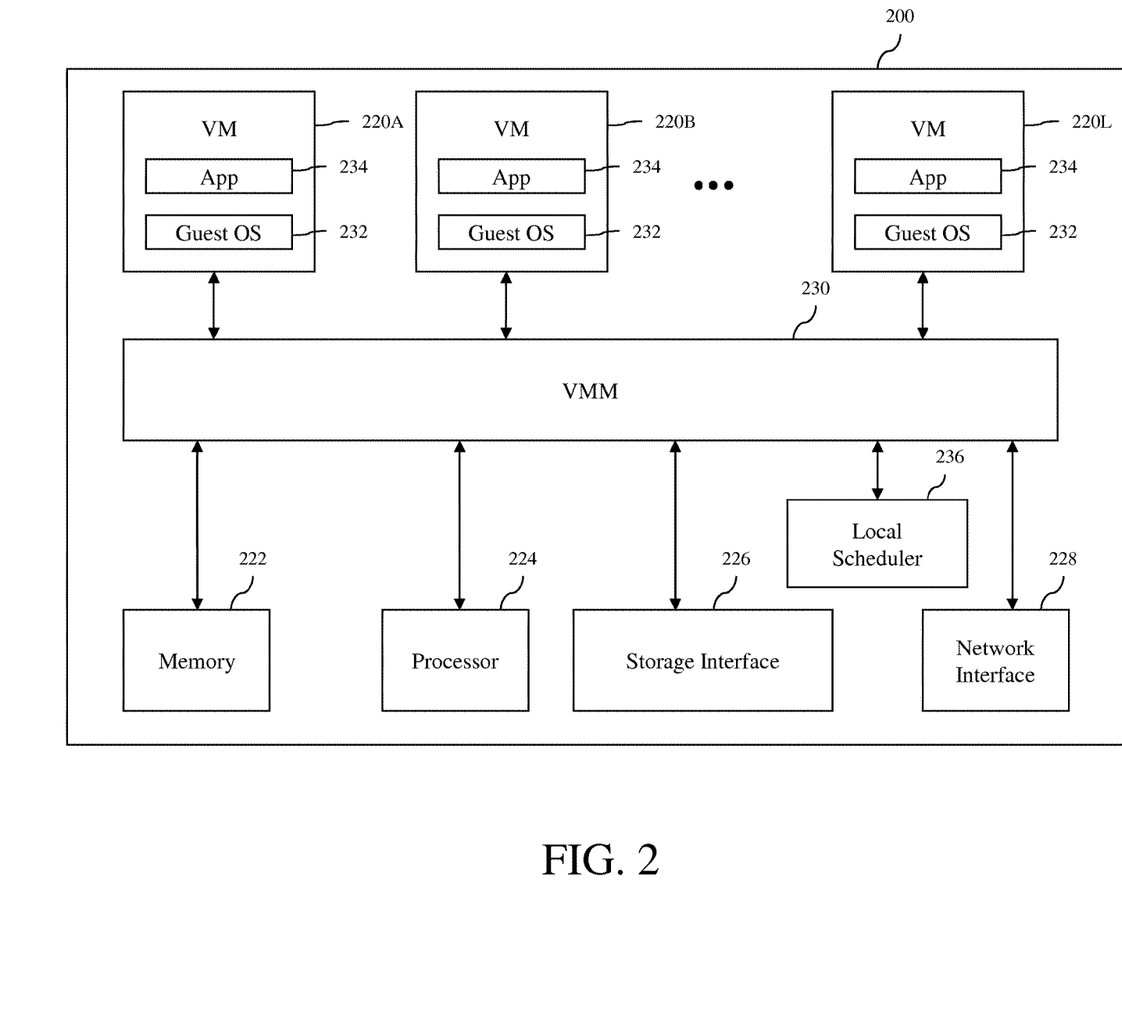
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows the host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software program running on the host computer. However, in other embodiments, the local scheduler may be implemented using any combination of software and hardware.

Turning back to FIG. 1, each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the clients running on the host computers, for example, virtual machines (VMs), in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server.

The cluster management servers 110 may also perform various operations to manage the clients and the host computers H-1, H-2 . . . H-M in their respective clusters. As illustrated in FIG. 1, in an embodiment, each cluster management server include the cluster resource management module (CRMM) 112, which can be enabled by a user, to perform resource allocations and load balancing in the respective cluster. The cluster resource management module operates to allocate available resources among clients running in the cluster based on a number of parameters, which may include predefined rules and priorities. The cluster resource management module may be configured to determine one or more appropriate host computers in the cluster when a new client is to be added to the cluster. The cluster resource management module may be configured to power down particular clients and/or host computers in the cluster to conserve power. The cluster resource management module in the cluster management server may be configured or programmed to perform other operations to manage the cluster. Each cluster management server may also include the cluster storage resource management module (CSRMM) 114, which can be enabled by a user, to perform storage resource management for the respective cluster. The cluster storage resource management module enables client disk placements (e.g., VM disk placements) and migrations to balance space and I/O resources across datastores that are associated with the cluster via recommendations or automated operations.

In some embodiments, the cluster management servers 110 may be physical computers. In other embodiments, the cluster management servers may be implemented as software programs running on physical computers, such as the host computer 200 shown in FIG. 2, or virtual computers, such as the 220A, 220B . . . 220L. In an implementation, the cluster management servers are VMware VCenter™ servers with at least some of the features available for such servers, the resource management modules 112 in the cluster management servers are VMware Distributed Resource Schedulers and the storage resource management modules 114 in the cluster management servers are VMware Storage Distributed Resource Schedulers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel (FC), Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 118, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cloud management server 106 operates to monitor and manage the clusters C-1, C-2 . . . C-N to provide a cloud environment using the host computers H-1, H-2 . . . H-M in the clusters. The cloud management server allows users or customers to create and use virtual datacenters (VDCs) with specified resource requirements. One VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. The cloud management server performs operations to manage the VDCs supported by the distributed computer system. In some embodiments, the cloud management server may be a physical computer. In other embodiments, the cloud management server may be implemented as software program running on a physical computer or a VM, which may be part of one of the clusters C-1, C-2 . . . C-N. In an implementation, the cloud management server is VMware VCloudDirector™ server with at least some of the features available for such a server.

The client placement module 108 in the cloud management server 106 operates to determine initial placement of new clients in host computers of the distributed computer system 100 using user-created requirement profiles for the new clients. As described in more detail below, the client placement module automatically selects a suitable host computer in one of the clusters C-1, C-2 . . . C-N to place each new client by determining the host computers in that cluster that satisfy resource requirements of the new client and satisfy desired host parameters. The client placement module may be implemented as software, hardware, firmware or any combination of software, hardware and/or firmware. In an exemplary embodiment, the client placement module is implemented as a software program installed in the cloud management server.

Figure 3:
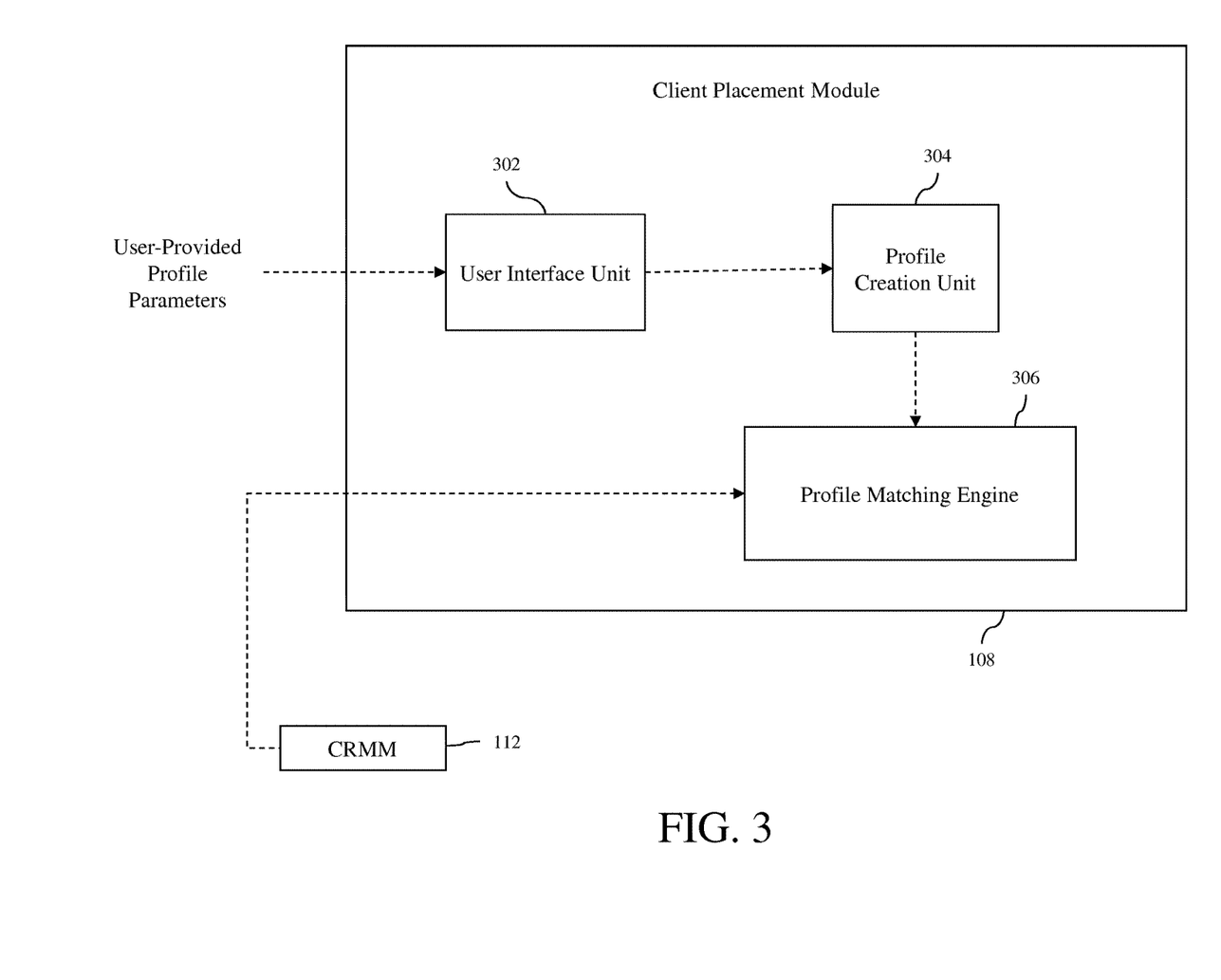
FIG. 3 is a block diagram of a client placement module included in the distributed computer system in accordance with an embodiment of the invention.

Turning now to FIG. 3, a block diagram of components of the client placement module 108 in accordance with an embodiment of the invention is illustrated. As shown in FIG. 3, the client placement module includes a user interface unit 302, a profile creation unit 304 and a profile matching engine 306. These components of the client placement module may be implemented in hardware, software, firmware or any combination of hardware, software and/or firmware. In one implementation, these components of the client placement module are implemented as one or more software programs installed in the cloud management server 106, which are executed by one or more processors associated with the cloud management server. If the cloud management server is a physical computer, the software programs may be executed by one or more processors of the cloud management server. If the cloud management server is implemented as software running on a physical computer, the software programs may be executed by one or more processors of the physical computer.

The user interface unit 302 of the client placement module 108 allows a user to create one or more requirement profiles for new clients, e.g., new virtual machines, to be placed in host computers in the distributed computer system 100. The user interface unit may provide a graphical user interface, which can be used by the user to input desired profile parameters of host computers to place the new clients, i.e., requirements of host computers that will host the new clients. These profile parameters may include intrinsic capabilities of a host computer. As used herein, intrinsic capabilities of a host computer are capabilities of the host computer that exist due to hardware and software installed in the host computer. The profile parameters may also include descriptions of the hardware and/or software installed in the host computer. The profile parameters may further include extrinsic capabilities of the host computer. As used herein, extrinsic capabilities of a host computer are capabilities of the host computer that exist due to external hardware and/or software associated with the host computer. These profile parameters can then be used to create one or more requirement profiles to find suitable host computers to place new clients.

The profile parameters of a requirement profile may include information regarding the suitable host computer, such as make and model of the host computer. The profile parameters of a requirement profile may also include information regarding storage, such as type(s) of storage available to the host computer. The profile parameters of a requirement profile may also include information regarding processor of the host computer, such as processor model, processor speed, number of sockets of the processor, number of cores per socket, number of logical processors and availability of hyperthreading. The profile parameters of a requirement profile may also include information regarding networking for the host computer, such as speed of the network interface card (NIC) of the host computer, link status, full duplex status, wake-on-LAN (WoL) support and firmware. The profile parameters of a requirement profile may also include information regarding resource reservations of the host computer, such as CPU and memory resources. The profile parameters of a requirement profile may also include information regarding software installed in the host computer, such as ESX server. The profile parameters of a requirement profile may also include information regarding I/O configuration, swap file location, power supply, battery and fan(s). Below is one example of a list of information included in a requirement profile.

Make
  Dell
  HP
  IBM
Storage
  Server(s) having only local storage
  Server(s) having only FC/iSCSI/NFS storage
  Server(s) having only SSD datastores
  Server(s) having different combinations of above three capabilities
Processor
  Model
  Speed
  No. of sockets
  No. of cores per socket
  No. of logical processors
  Availability of hyperthreading
  Support for fault tolerance (FT)
Networking
  NICs' Speed
  Link Status
  Full Duplex status
  WoL support
  Firmware
DirectPath I/O Configuration for different devices
System Resource Reservation
  CPU
  Memory
Swap file location
  Another datastore
  VM Directory
VMware ESX
  Version
  Patches
Fan
  No. of Fans
  RPM of each Fan
Temperature
  Temperature in Degree C.
Power
  Power supply in Watts
Software Components
  List of software components
Battery
  CMOS battery status These profile parameters can be entered by a user using the graphic user interface provided by the user interface unit 302 of the client placement module 108. In an embodiment, the graphic user interface may provide pull-down options for at least some of the profile parameters so that the user can easily select the appropriate options for the profile parameters. In other embodiments, the graphic user interface may provide other means to enter the profile parameters.

In an alternative embodiment, the user interface unit 302 of the client placement module 108 may be an application program interface that allows an external program to interface with the client placement module so that a user can input profile parameters into the client placement module via the user interface unit. As an example, the user interface unit may allow the user to input profile parameters using a web application or a web page that interfaces with the user interface unit.

In addition to inputting the profile parameters, the user may also be allowed to set the importance of at least some of the profile parameters. Thus, some of the profile parameters can be set to the highest importance level, while other profile parameters can be set to lower importance levels down to the lowest importance level. In one implementation, each profile parameter can be set to one of three settings, e.g., a "Must Have" setting (highest importance), a "Good to Have" setting (medium importance) or a "Nice to Have" setting (lowest importance). As described below, these importance settings for profile parameters can be used to create multiple requirement profiles with assigned priority information.

The profile creation unit 304 of the client placement module 108 receives the profile parameters provided by the user via the user interface unit 302 and creates requirement profiles for new clients to be placed. The profile creation unit collects all the profile parameters entered by the user for a particular client and associates all the data so that one or more requirement profiles can be created for that particular client. In some embodiments, the profile creation unit may assign different priorities for multiple requirement profiles for a single client using the importance settings of the profile parameters. Thus, different requirement profiles can be created using different combinations of the importance settings for various profile parameters. As an example, the requirement profile with the highest priority may include all the profile parameters specified by a user, and the requirement profile with the lowest priority may include only the profile parameters with the highest importance setting. Other requirement profiles may be created that includes the profile parameters with the highest importance settings and some combination of other profile parameters with lower importance settings. In an exemplary implementation, the requirement profile with the highest priority (i.e., first priority) includes all the profile parameters or host requirements specified by the user. The requirement profile with the second highest priority (i.e., second priority) includes all the "Must Have" profile parameters and "Good to Have" profile parameters specified by the user. The requirement profile with the third highest priority (i.e., third priority) includes all the "Must Have" profile parameters and the "Nice to Have" profile parameters specified by the user. The requirement profile with the fourth and lowest highest priority (i.e., fourth priority) includes only the "Must Have" profile parameters specified by the user.

The profile creation unit 304 may store the requirement profiles in any data structure format that can be processed by the profile matching engine 306 of the client placement module 108. These requirement profiles for new clients can be stored in any computer storage accessible by the client placement module 108 so that the requirement profiles can be used by the profile matching engine.

The profile matching engine 306 of the client placement module 108 operates to determine suitable host computers in one of the clusters C-1, C-2 . . . C-N to place new clients using the requirement profiles created for the new clients and using candidate host computers selected by the cluster resource management module 112 of that cluster. The cluster resource management module is configured to determine one or more candidate host computers in the respective cluster when a new client is to be added to that cluster. In an embodiment, the cluster resource management module of a cluster operates to select candidate host computers in the cluster for initial placement of new clients based on resource requirements of the new clients and current load balancing conditions of the host computers in the cluster. When a new client with certain resource requirements is to be placed in the cluster, the cluster resource management module determines which host computers in the cluster have enough available resources to accommodate the new client. This process will be referred to herein as a resource allocation analysis. In addition to the resource allocation analysis, the cluster resource management module may also determine which host computers in the cluster can handle the expected workload of the new clients in view of the current workload of the host computers in the cluster. This process will be referred to herein as a load balancing analysis.

For each new client, the profile matching engine 306 examines each of the candidate host computers selected by the cluster resource management module 112 to determine which of these candidate host computers include the profile parameters specified in a requirement profile for that new client. In an embodiment, the profile matching engine first uses or applies the requirement profile with the highest priority for the new client and determines whether any of the candidate host computers selected by the cluster resource management module satisfies the profile parameters specified in the requirement profile. If none of the candidate host computers satisfies the profile parameters specified in the requirement profile, the profile matching engine then uses or applies the requirement profile with the second highest priority for the new client to determine which of the candidate host computers satisfies the profile parameters specified in that requirement profile. If none of the candidate host computers satisfies the profile parameters specified in the requirement profile with the second highest priority, the profile matching engine then uses the requirement profile with the next highest priority, and so on, until one or more suitable host computers are found for the new client. Thus, the profile matching engine successively applies the requirement profiles with different priorities until at least one suitable host computer is found. If no suitable host computer can be found using all of the requirement profiles for the new client, then options may be presented to the user to find a suitable host computer for the new client. As an example, the profile matching engine may output the fact that there are no host computers in the cluster that satisfies the requirement profiles and suggest that the user revisit and disable or change one or more of the profile parameters set to higher importance (e.g., the "Must Have" profile parameters) to lower importance. The process can then be repeated with new requirement profiles created using the modified profile parameters until a suitable host computer in the cluster is found. The profile matching engine may also allow the user to force one of the host computers in the cluster to host the new client even though none of the candidate host computers satisfies the requirement profiles. Alternatively, the profile matching engine may output the fact that there are no host computers in the cluster that satisfy the requirement profiles and allow the user decide the course of action, such as adding a new host computer that has features to meet the requirements of the user to the cluster.

However, if one or more candidate host computers selected by the cluster resource management module 112 have been determined or identified to be suitable in view of one of the requirement profiles for the new client, then the new client can be manually or automatically placed in one of the suitable host computers. Whether the new client is automatically placed may depend on the user setting of the client placement module 108. If the client placement module is set to a manual placement setting, the suitable host computers determined by the profile matching engine 306 will be presented to the user so that the user can manually place the new client in one of the suitable host computers. If the client placement module is set to an automatic placement setting, one of the suitable host computers determined by the profile matching engine will be selected and the new client is automatically placed in the selected host computer. The process of placing or hosting a client, such as a VM, in a host computer is well known and thus, is not described herein.

Figure 4:
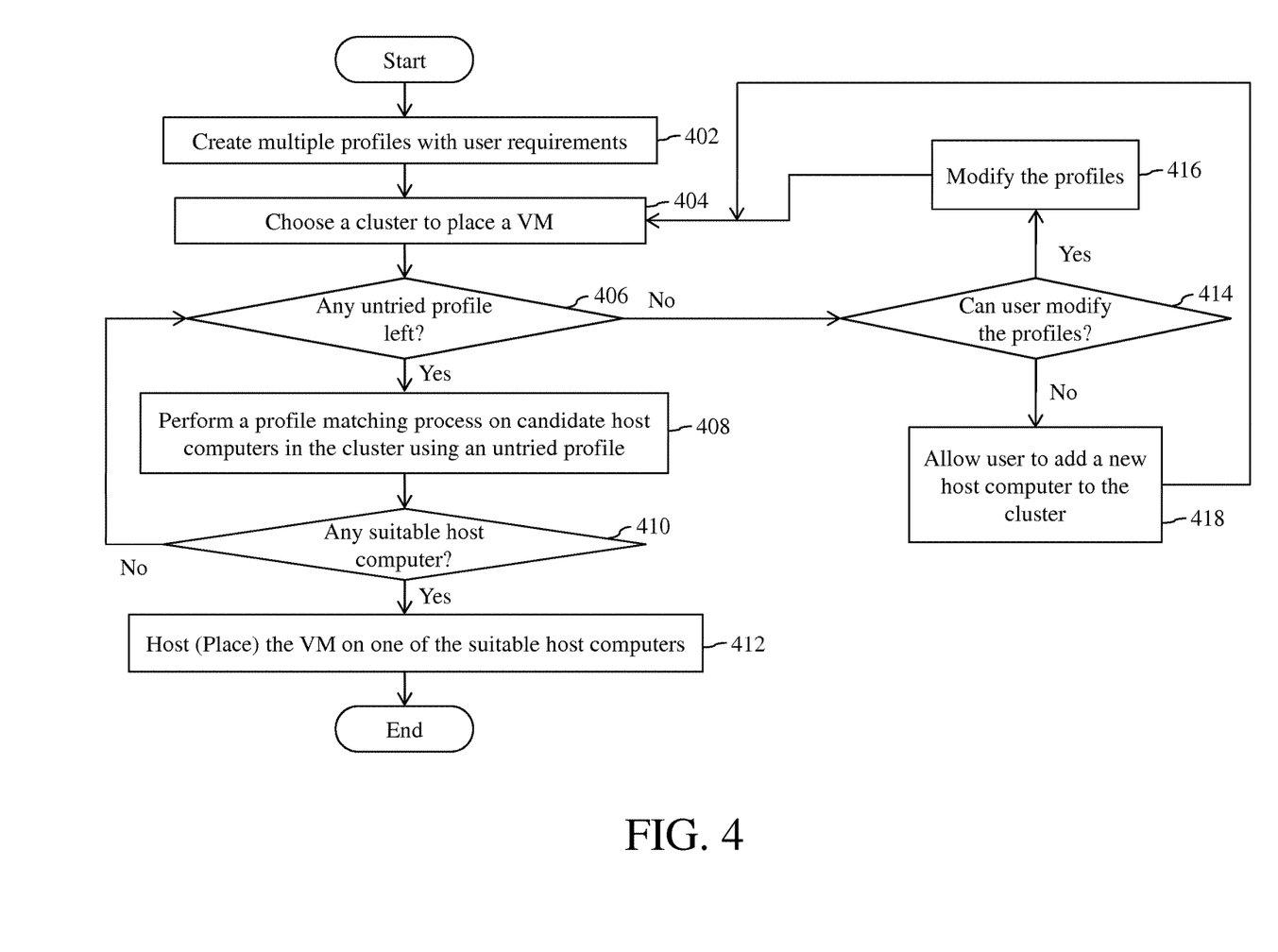
FIG. 4 is a flow diagram of an initial placement operation performed by the client placement module in accordance with an embodiment of the invention.

The initial placement operation performed by the client placement module 108 in accordance with an embodiment of the invention is described with reference to a flow diagram of FIG. 4. In this description, a new client to be placed is a VM. However, this operation can be used to place any client in a host computer of a cluster. The operation begins after a user inputs profile parameters for the new VM to be placed into the client placement module using the user interface unit 302. As described above, the user may set the importance for at least some of the profile parameters. After the profile parameters have been entered by the user for the new VM, one or more requirement profiles are created using the user-entered profile parameters by the profile creation unit 304, at block 402. Next, at block 404, a cluster in the distributed computer system 100 is chosen to place the new VM. At block 406, a determination is made whether any untried requirement profile is left. If there is at least one untried requirement profile, then a profile matching process is performed by the profile matching engine 306 on candidate host computers provided by the cluster resource management module 112 of the chosen cluster using an untried requirement profile with the highest priority to determine if any candidate host computer satisfies the profile parameters of the requirement profile, at block 408.

Next, at block 410, a determination is made whether the profile matching process produced any suitable host computer to host the new VM. If the profile matching process returns at least one host computer, then the VM is hosted on one of the suitable host computers, at block 412, which can be done automatically or manually. The operation then comes to an end.

If the profile matching process returns no suitable host computer to host the new VM, the operation then proceeds back to block 406 so that another requirement profile can be applied, if there is another untried requirement profile.

However, if there are no untried requirement profiles remaining, the operation proceeds to block 414, where a determination is made whether the user can modify the requirement profiles by changing at least one of the profile parameters. If modifying the requirement profiles is allowed and the user has changed at least one of the profile parameters, then the requirement profiles are modified in response to the changes, at block 416. The operation then proceeds back to block 404 so that the modified requirement profiles can be used to find a suitable host computer for the new VM.

If modifying the requirement profiles is not allowed, then the user may be given an opportunity to add a new host computer to the computer cluster that meets the requirements of the user, at block 418. If the user has added a new host computer, the operation proceeds back to block 404 so that the requirement profiles can be again applied to the computer cluster with the new host computer, which should result in the new host computer being selected to place the new VM.

In this manner, a new client, e.g., a VM, can be placed in a host computer in a selected cluster that satisfies resource and/or load balancing requirements of the new client and also satisfies host requirements specified by a user for the new client, which may include host capabilities and/or host descriptions.

Figure 5:
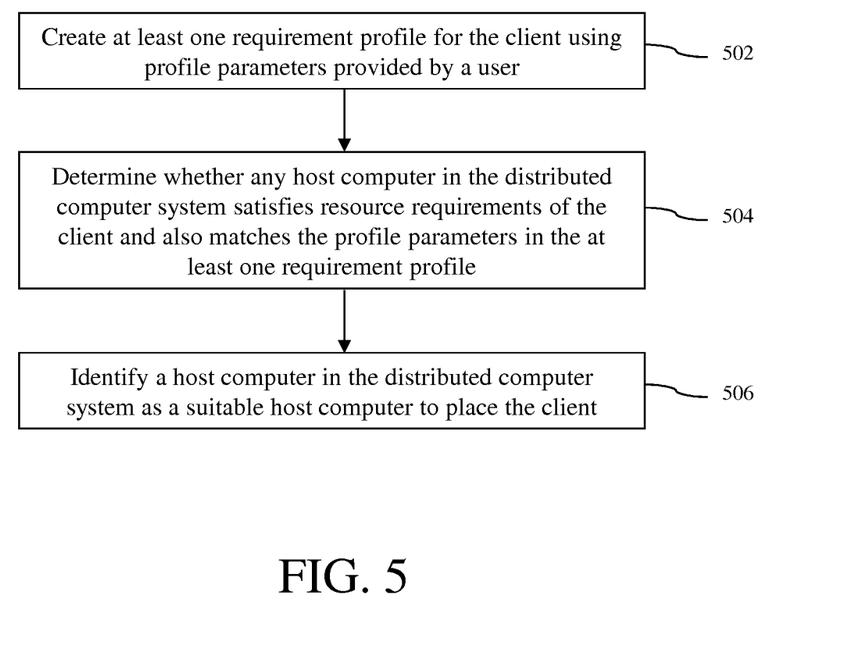
FIG. 5 is a flow diagram of a method for placing a client in a distributed computer system in accordance with an embodiment of the invention.

A method for placing a client in a distributed computer system in accordance with an embodiment of the invention in accordance with an embodiment of the invention is described with reference to a flow diagram of FIG. 5. At block 502, at least one requirement profile for a client to be placed is created using profile parameters provided by a user. The requirement profile includes at least some of the profile parameters. Next, at block 504, a determination is made whether any host computer in the distributed computer system satisfies resource requirements of the client and also matches the profile parameters in the requirement profile. Next, at block 506, a host computer in the distributed computer system is identified as a suitable host computer to place the client if the host computer satisfies the resource requirements of the client and also matches the profile parameters in the requirement profile.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for placing a client in a distributed computer system, the method comprising:

receiving profile parameters from a user, wherein at least some of the profile parameters have importance settings that are set to a highest importance level, a lower importance level and a lowest importance level, wherein the highest importance level indicates that a first profile parameter is required by the user in a corresponding requirement profile, the lower importance level indicates that a second profile parameter is not required by the user but is desirable by the user in the corresponding requirement profile and the lowest importance level indicates that a third profile parameter is less important to the user in the corresponding requirement profile than the second profile parameter;

automatically creating multiple requirement profiles with different priorities for the client using the profile parameters provided by the user, each of the multiple requirement profiles including at least some of the profile parameters, the multiple requirement profiles including at least a first requirement profile with a highest priority and a second requirement profile with a lowest priority, the first requirement profile with the highest priority including at least one profile parameter not included in the second requirement profile with the lowest priority, wherein the at least one profile parameter is not required by the user but is desirable by the user in the first requirement profile with the highest priority;

determining whether any host computer in the distributed computer system satisfies resource requirements of the client and also matches the profile parameters in one of the multiple requirement profiles, including successively applying the multiple requirement profiles with different priorities in an order from the first requirement profile with the highest priority to the second requirement profile with the lowest priority if no host computer in the computer cluster matches the profile parameters of one or more applied requirement profiles until at least one host computer that matches the profile parameters for one of the multiple requirement profiles is found, wherein a requirement profile with a lower priority includes fewer profile parameters than a requirement profile with a higher priority, and wherein each of the requirement profiles with the different priorities includes the profile parameters with the importance settings set at the highest importance level; and identifying a host computer in the distributed computer system as a suitable host computer to place the client if the host computer satisfies the resource requirements of the client and also matches the profile parameters in the requirement profile.

2. The method of claim 1, wherein the profile parameters provided by the user includes at least one of a capability and a feature of a desired host computer in which to place the client.

3. The method of claim 1, wherein the determining whether any host computer in the distributed computer system satisfies the resource requirements of the client includes executing a resource allocation analysis on host computers of a cluster of host computers in the distributed computer system to determine one or more candidate host computers in which to place the client.

4. The method of claim 3, wherein the determining whether any host computer in the distributed computer system satisfies the resource requirements of the client includes performing a load balancing analysis on the host computers of the cluster of host computers in the distributed computer system.

5. The method of claim 3, wherein the determining whether any host computer in the distributed computer system matches the profile parameters in the at least one requirement profile includes determining whether any of the determined candidate host computers match the profile parameters in the at least one requirement profile.

6. The method of claim 1, wherein the successively applying each of the multiple requirement profiles includes first applying the first requirement profile with the highest priority and then subsequently applying a requirement profile with the next highest priority if no host computer in the computer cluster matches the profile parameters of the first requirement profile with the highest priority, wherein the requirement profile with the next highest priority includes fewer profile parameters than the first requirement profile with the highest priority.

7. The method of claim 6, wherein the applying the first requirement profile with the highest priority includes applying the first requirement profile with the highest priority that includes all the profile parameters regardless of the importance settings of the some of the profile parameters.

8. The method of claim 7, further comprising applying the second requirement profile with the lowest priority that includes only the profile parameters with the importance settings set at the highest importance level.

9. A management server for a distributed computer system comprising:

memory and a processor configured to:

receive profile parameters from a user, wherein at least some of the profile parameters have importance settings that are set to a highest importance level, a lower importance level and a lowest importance level, wherein the highest importance level indicates that a first profile parameter is required by the user in a corresponding requirement profile, the lower importance level indicates that a second profile parameter is not required by the user but is desirable by the user in the corresponding requirement profile and the lowest importance level indicates that a third profile parameter is less important to the user in the corresponding requirement profile than the second profile parameter;

automatically create multiple requirement profiles with different priorities for the client using the profile parameters provided by the user, each of the multiple requirement profiles including at least some of the profile parameters, the multiple requirement profiles including at least a first requirement profile with a highest priority and a second requirement profile with a lowest priority, the first requirement profile with the highest priority including at least one profile parameter not included in the second requirement profile with the lowest priority, wherein the at least one profile parameter is not required by the user but is desirable by the user in the first requirement profile with the highest priority;

determine whether any host computer in the distributed computer system satisfies resource requirements of the client and also matches the profile parameters in one of the multiple requirement profiles, including successively applying the multiple requirement profiles with different priorities in an order from the first requirement profile with the highest priority to the second requirement profile with the lowest priority if no host computer in the computer cluster matches the profile parameters of one or more applied requirement profiles until at least one host computer that matches the profile parameters for one of the multiple requirement profiles is found, wherein a requirement profile with a lower priority includes fewer profile parameters than a requirement profile with a higher priority, and wherein each of the requirement profiles with the different priorities includes the profile parameters with the importance settings set at the highest importance level; and identify a host computer in the distributed computer system as a suitable host computer to place the client if the host computer satisfies the resource requirements of the client and also matches the profile parameters in the requirement profile.

10. The management server of claim 9, wherein the profile parameters provided by the user includes at least one of a capability and a feature of a desired host computer in which to place the client.

11. The management server of claim 9, wherein the processor uses results of a resource allocation analysis on host computers of a cluster of host computers in the distributed computer system to determine the suitable host computer.

12. The management server of claim 11, wherein the processor uses results of a load balancing analysis on the host computers of the cluster of host computers in the distributed computer system to determine the suitable host computer.

13. The management server of claim 9, wherein the processor is configured to first apply the first requirement profile with the highest priority and then subsequently apply a requirement profile with the next highest priority if no host computer in the computer cluster matches the profile parameters of the requirement profile with the highest priority, wherein the requirement profile with the next highest priority includes fewer profile parameters than the first requirement profile with the highest priority.

14. The management server of claim 13, wherein the processor is configured to apply the first requirement profile with the highest priority that includes all the profile parameters regardless of the importance settings of the some of the profile parameters.

15. The management server of claim 14, wherein the processor is configured to apply the second requirement profile with the lowest priority that includes only the profile parameters with the importance settings set at the highest importance level.

16. A non-transitory computer-readable storage medium containing program instructions for placement of a client in a distributed computer system, wherein execution of the program instructions by one or more processors of a computer system causes the one or more processors to perform steps comprising:

receiving profile parameters from a user, wherein at least some of the profile parameters have importance settings that are set to a highest importance level, a lower importance level and a lowest importance level, wherein the highest importance level indicates that a first profile parameter is required by the user in a corresponding requirement profile, the lower importance level indicates that a second profile parameter is not required by the user but is desirable by the user in the corresponding requirement profile and the lowest importance level indicates that a third profile parameter is less important to the user in the corresponding requirement profile than the second profile parameter;

automatically creating multiple requirement profiles with different priorities for the client using the profile parameters provided by the user, each of the multiple requirement profiles including at least some of the profile parameters, the multiple requirement profiles including at least a first requirement profile with a highest priority and a second requirement profile with a lowest priority, the first requirement profile with the highest priority including at least one profile parameter not included in the second requirement profile with the lowest priority, wherein the at least one profile parameter is not required by the user but is desirable by the user in the first requirement profile with the highest priority;

determining whether any host computer in the distributed computer system satisfies resource requirements of the client and also matches the profile parameters in one of the multiple requirement profiles, including successively applying the multiple requirement profiles with different priorities in an order from the first requirement profile with the highest priority to the second requirement profile with the lowest priority if no host computer in the computer cluster matches the profile parameters of one or more applied requirement profiles until at least one host computer that matches the profile parameters for one of the multiple requirement profiles is found, wherein a requirement profile with a lower priority includes fewer profile parameters than a requirement profile with a higher priority, and wherein each of the requirement profiles with the different priorities includes the profile parameters with the importance settings set at the highest importance level; and identifying a host computer in the distributed computer system as a suitable host computer to place the client if the host computer satisfies the resource requirements of the client and also matches the profile parameters in the requirement profile.

17. The non-transitory computer-readable storage medium of claim 16, wherein the determining whether any host computer in the distributed computer system satisfies the resource requirements of the client includes executing a resource allocation analysis on host computers of a computer cluster in the distributed computer system to determine one or more candidate host computers in which to place the client.

18. The non-transitory computer-readable storage medium of claim 17, wherein the determining whether any host computer in the distributed computer system satisfies the resource requirements of the client includes performing a load balancing analysis on the host computers of the cluster of host computers in the distributed computer system.

19. The non-transitory computer-readable storage medium of claim 18, wherein the determining whether any host computer in the distributed computer system matches the profile parameters in the at least one requirement profile includes determining whether any of the determined candidate host computers match the profile parameters in the at least one requirement profile.

20. The non-transitory computer-readable of claim 16, wherein the successively applying each of the multiple requirement profiles includes first applying the first requirement profile with the highest priority and then subsequently applying a requirement profile with the next highest priority if no host computer in the computer cluster matches the first profile parameters of the requirement profile with the highest priority, wherein the requirement profile with the next highest priority includes fewer profile parameters than the first requirement profile with the highest priority.

* * * * *